June 11, 1935. H. HEAULME 2,004,111
APPARATUS FOR PRESENTING ADVERTISEMENT PICTURES AND OTHERS
Filed March 31, 1934 2 Sheets-Sheet 1
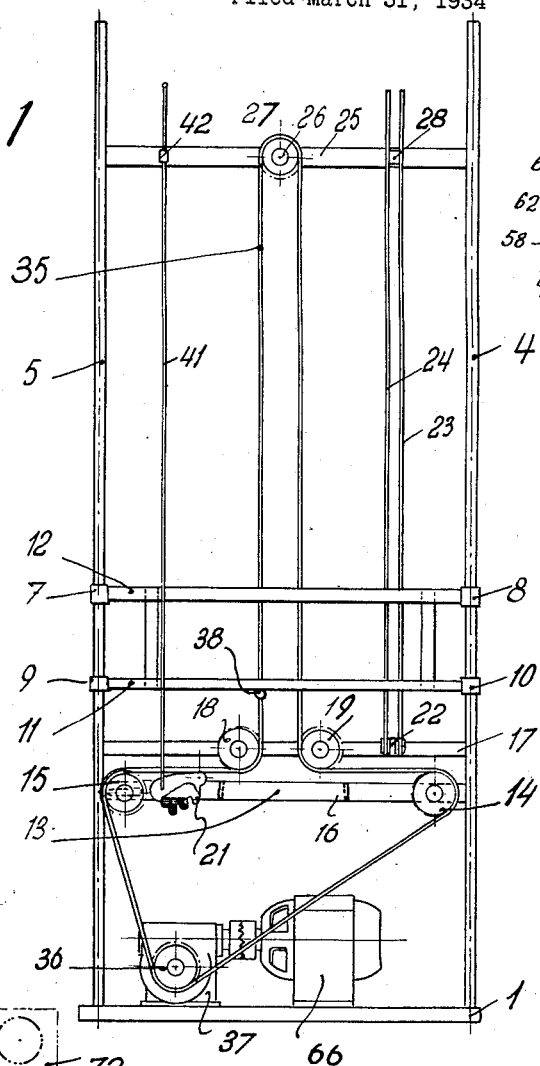
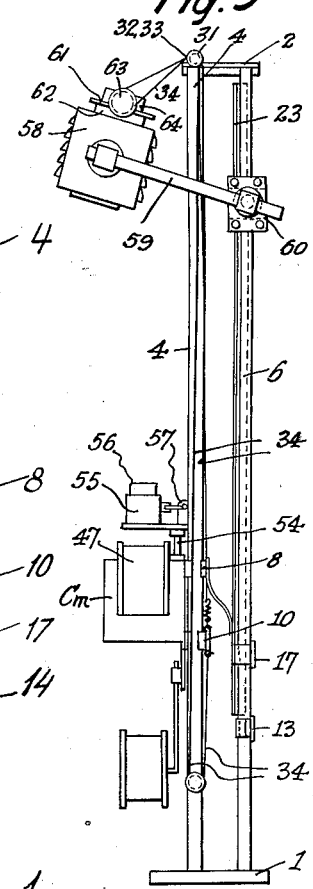
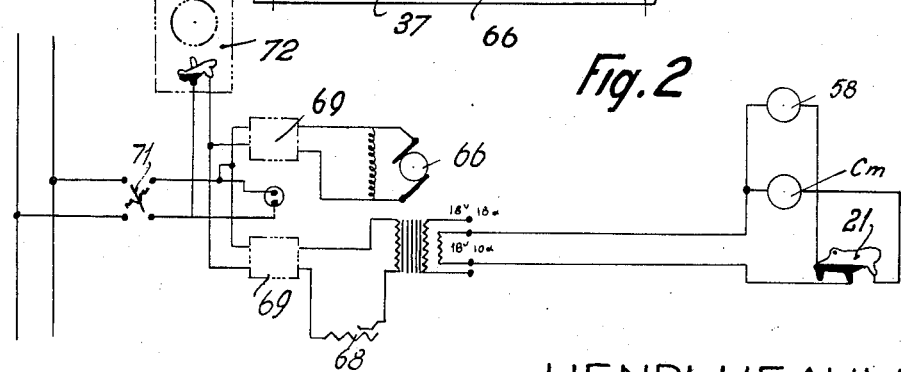
HENRI HEAULME
INVENTOR
BY Haseltine, Lake & Co.
ATTORNEYS

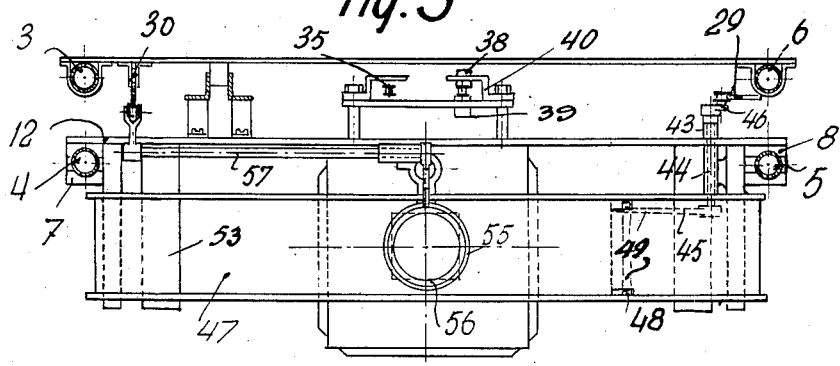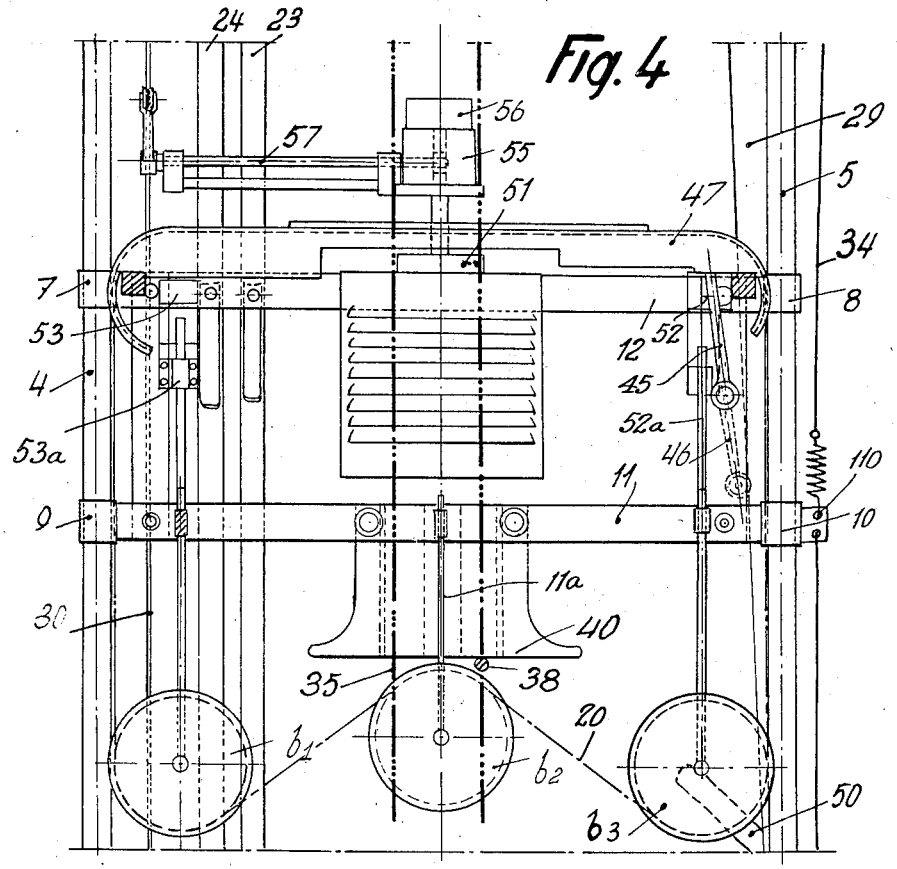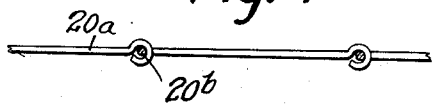

Patented June 11, 1935

2,004,111

UNITED STATES PATENT OFFICE 2,004,111

APPARATUS FOR PRESENTING ADVERTISEMENT-PICTURES AND OTHERS

Henri Heaulme, Paris, France

Application March 31, 1934, Serial No. 718,346
In France April 4, 1933

6 Claims. (Cl. 88—24)

The object of the present invention is to provide improvements in apparatus for displaying a succession of pictures, which apparatus include a box or casing at the upper part of which there is disposed a screen on which the images formed by a projection apparatus are reflected, with the desired enlargement, by means of a mirror, the focussing of the image on the screen being ensured by means of a suitable optical system.

The improvements according to the present invention consists in providing at least two projectors one of which is movable, and will be hereinafter called main or chief projector, while the other, which will be hereinafter called auxiliary projector, alternates with the other projector for illuminating the screen. The chief or main projector is movable with respect to the screen and serves to project thereon a new picture for each upward and downward stroke of said main projector, said picture being constantly focussed, owing to a set of lenses movable simultaneously with said projector. Said main projector is movably mounted in a frame which supports picture-carrying bands arranged to move forward in front of said main projector so that the images they carry are projected onto the screen during the periods for which the stationary (auxiliary) projector is switched off.

The passage from one picture to another one and the alternating switching in and off of the two projectors are controlled by a suitable combination of fingers carried by the chain that serves to drive the main projector carrying frame with corresponding elements provided on the main projector and levers controlling the tilting of mercury switches which open or close the electric circuits of said projectors. A clockwork mechanism is further provided for starting and stopping the apparatus fixed in a public place at predetermined times.

A preferred embodiment of the present invention will be hereinafter described with reference to the accompanying drawings, given merely by way of example, and in which:

Fig. 1 is a front view of the mechanism for imparting successive upward and downward displacements to the band carrying carriage;

Fig. 2 is a diagram of the electric connections;

Fig. 3 is a plan view of the movable carriage;

Fig. 4 is a front view corresponding to Fig. 3;

Fig. 4a is a detail view of the band of pictures shown on a larger scale.

Fig. 5 is a side view of the apparatus showing the working of the stationary projector;

The apparatus according to the present invention comprises the following parts:

(a) A cast iron pedestal 1, supporting four columns 3, 4, 5 and 6, the electric motor 66 and the speed reducing gear 37. On this pedestal is also fixed the electric apparatus board.

(b) Four columns or uprights, two on each side, are fixed to pedestal 1 and connected together at the top by a frame 2 made of sectional irons.

Uprights 4 and 5, that is to say the front ones, act as guides for brass bushes 7, 8, 9 and 10, themselves rigidly carrying the cross pieces 11 and 12 of the movable carriage Cm. The two other uprights 3 and 6, which also act as bracing members, support all the stationary parts of the mechanism, while the two first mentioned uprights, 4 and 5, guide only the movable parts.

(c) The stationary parts of the mechanism are made as follows:

A cross member 13 supports two sprocket wheels 14 and 15, one of which, 14, is stationary, while the other one, 15, is adjustable and a steel shoe 16 with its cross members.

A cross member 17 carries two other sprocket wheels 18 and 19, fixed in a stationary manner. This member 17 further carries a mercury switch 21 pivotally mounted on said cross member 17.

This member 17 further carries a small plate of fibre 22, which serves to maintain in position two brass rods 23 and 24.

A third cross member 25, placed at the top, supports the spindle 26 of sprocket wheel 27 and also a piece of fibre 28 which maintains in position the upper ends of contact rods 23 and 24.

The three cross members above referred to are fixed to uprights 3 and 6 by suitable fixation straps.

These uprights 3 and 6 further carry bands 29 and 30, which form kinds of cams, one of these bands, 29 controlling the forward movement of the band, while the other one, 30, controls the automatic focussing of the objective.

These bands 29 and 30 are fixed by means of collars and straps.

A metallic piece 31 fixed to frame 2 supports the spindle of the two upper pulleys 32 and 33 of the cable 34 that controls the working of the variable colour device called "chromatrope" as will be hereinafter described.

Cross member 25 serves to guide rod 41, which slides in a support 42. This rod controls the displacement of mercury switch 21.

On upright 3, below cross member 25, there is fixed a supporting plate for the auxiliary (stationary) projector 58.

(d) *Chain and pinions.* The displacement of carriage $C_m$ is obtained through the action of an endless chain 35, of the roller type, driven by the pinion 36 of the speed reducing gear 37.

This chain is provided, on the spindle of one of its links, with two small rollers 38 and 39 which, in the course of the movement of said chain, lift the movable carriage through a member 40 fixed to the cross member 11 of the carriage. While moving along their path of travel, rollers 38 and 39 cause the support of the mercury switch 21 to pivot so as to open or close the circuit.

The movable carriage $C_m$ comprises four brass sleeves, two of which are wholly closed (7 and 8) and provided at their upper part with a small circular cup adapted to receive some drops of oil for lubrication. The two other sleeves (9 and 10) are open, in order to leave the carriage entirely free to move in a vertical direction, while ensuring an accurate guiding thereof.

The lower cross member 11 carries the part 40 on which the rollers 38 and 39 of the chain come to bear.

On this cross member 11 are fixed the supports of three intermediate reels $b_1$, $b_2$, $b_3$, serving to guide the band 20 of pictures.

This cross member also carries an iron part 110 (Fig. 4) to which are secured both of the ends of the cable 34 for actuating the parts of the chromatrope.

On the two cross members 11 and 12 there are fixed two strong brackets 52, 53, made of aluminium, acting as supports for passage 47 and all the parts of the band.

Passage 47, cast in a single piece of aluminium, is maintained by four screws on brackets 52 and 53. It is provided, along the whole of its length, with a path for the band of pictures, so as to guide it and maintain it in suitable position.

On the right hand side, recesses are provided for affording passage to two grips 48 serving to move forward the band of pictures.

In the middle part, an aperture is provided for the passage of the light rays. A closure plate, secured by a fixation screw provided with an aperture for the passage of the light rays corresponding to the aperture of members 47, is placed above the latter.

On the right hand side of the two cross members 11 and 12 there is provided a sleeve 43 supporting a spindle 44. To the ends of said spindle are fixed, on either side respectively, levers 45 and 46 which serve to move the band forward. The lever 46, which slides, through a roller, along the cam-forming band 29, acts, through spindle 44, on the lever 45 fixed to the opposite end of said spindle. Lever 46 actuates traveller 49 hidden under the member 47 (see Fig. 3).

Under this traveller, the two grips 48 are maintained by means of a spring. For each upward stroke of the carriage, the picture carrying band is moved forward the desired amount.

During the downward stroke of the carriage, the lever 45 is brought back to its initial position by contact with inclined surface 50. Gripping members 48 are made of such a shape that they are then brought out of the way, moving backwards without displacing the band of pictures.

Member 47 supports a part 51, which forms a casing for the optical condenser. It supports, at its upper part, the whole of the setting of the objective 56. This arrangement includes a pivot 54 and a casing 55 in which the objective 56 can slide freely.

The lens is constantly focussed through a system of levers 57 bearing at one end, through a roller, on the cam-forming band 30, and at the other end on a lug fixed to said lens.

Two metallic rods fixed to cross member 12 support the lantern and its accessories.

The two outer reels $b_1$, $b_3$ guiding the band 20 of pictures are supported by rods 52a, 53a respectively themselves fixed to the brackets 52 and 53. The other reel, $b_2$ is fixed to cross piece 11 through a rod 11a.

These reels are adjustable in the vertical direction with respect to the rods by which they are carried, so as to ensure a proper support to the picture carrying band in the course of its displacements.

The second projector (chromatrope) 58, which is preferably arranged to project onto the screen coloured changing images, is supported by a rigid tube 59. At one end of the tube there is fixed the light box of the chromatrope, which can slide on this tube, so as to permit of centering the image projected onto the screen.

The other end of this tube is fixed to upright 3 through a supporting plate 60 on which is secured a sleeve in which the tube can also slide in order to further facilitate its centering.

The light box 58 is similar to that of the main projector. Above the lantern there is provided a part 61 of cast aluminium which carries, at its lower end, a sleeve 62 in which is placed the optical condenser, and, above this, the colour changing device, which comprises two glasses one of which is mounted in a crown wheel operatively driven, through a small pinion, by a spindle at the end of which is keyed a pulley 63. The cable 34 that serves to control this device passes around said pulley.

The objective is mounted in a casing 64 which is slidable in its support 61, thus permitting to adjust it.

The picture carrying band consists of independent elements 20a connected through strong pins forming spindles 20b. The band can thus be made to include the required number of elements.

The electric devices are the following:

First a constant speed motor 66, and a speed reducing gear 37. The latter transmits the rotary movement to a shaft on which is mounted the driving pinion 36 of the chain. The number of teeth of this pinion depends on the speed of revolution of the motor.

The motor and the reducing gear are coupled together along the same axis, this condition being necessary if vibrations are to be avoided.

A small rheostat 68 is provided in order to reduce the voltage of the lamps, which reduces a little their luminosity but increases their life.

A mercury switch of the tilting type, 21, switches on these two lamps alternately, as shown in Fig. 2.

A double-pole hand switch 71 is placed on the distribution board, so as to permit of cutting off the current fed to the apparatus.

The whole of the electric connections is insulated and, if necessary placed in tubes.

The working of the apparatus includes three periods for each cycle, which, from the mechanical point of view, correspond to the following movements:

(a) *The dimensions of the projected image are increasing.*—The movable carriage being at the top of its stroke, moves down along the uprights, being driven downward by its own weight and supported by two rollers 38, 39 of the endless chain, which is constantly moving. During this period, the lamp of the main projector is on. One of the pictures of the band is therefore projected and its image is constantly growing larger and larger on the screen as the movable carriage is moving away therefrom. The image is always well focussed since the objective is automatically adjusted as above explained.

At the end of its downward stroke, the movable carriage is stopped by an element of part 40 which bears against the spindles of sprocket wheels 18 and 19.

During the downward stroke, the lever 46 of the system for driving the band of pictures has been brought back to its initial position by coming into contact, at the end of the downward stroke, with inclined surface 50. This displacement of levers 45 and 46 has for its effect to bring the gripping members 48 into the required position for driving the band forwards.

(b) *Projection of the image in a fixed position.*—When the carriage has reached the end of its downward stroke, the picture of the band that has been projected on the screen by the main projector remains visible in its largest size for a few seconds. During this time the chain keeps on moving until the two rollers 38, 39 mounted on one of the spindles of the chain again come into contact with piece 40.

(c) *Projection of images by the stationary projector.*—Just before the movable carriage starts moving upwardly, the two rollers 38, 39 of the chain have acted on the mercury switch, so as to cut off the current of the lamp of the main projector and to switch on the lamp of the chromatrope projector. As the movable carriage moved upwardly, the objective, operatively controlled by cam 30 is moved in an inverse direction from that corresponding to the downward movement, so that, when it reaches the top of its stroke, it is in the proper position. At the same time, the lever 46 of the device for moving forward the band, controlled by cam 29, will have moved traveller 49 and therefore gripping members 48. The latter have therefore caused the picture carrying band to move forward a distance corresponding to one picture.

During this time, the stationary projector projects light through coloured glasses onto the screen and one of these glasses is given a rotary displacement through the cable 34 of the chromatrope device, pulley 63 and the crown wheel on which the glass in question is mounted.

At the top of its upward stroke, the movable carriage lifts rod 41, and thus causes the mercury switch 21 to pivot. The lamp of the chromatrope projector is switched off and that of the main projector is switched on.

The operations above described are then repeated.

While I have described what I deem to be preferred embodiments of my invention, it should be well understood that I do not wish to be limited thereto as there might be changes made in the arrangement, disposition and form of the parts without departing from the principle of my invention as comprehended within the scope of the appended claims.

What I claim is:

1. An apparatus for the projection of advertising and other images on a screen provided at the top of a box, which comprises in combination, a frame, a plurality of uprights in said frame, a carriage movable vertically along at least some of these uprights, a projector carried by this carriage, motive means for driving said carriage upwardly and controlling the downward movement thereof under the action of its weight, means operatively connected with said motive means for constantly focussing said projector on said screen, a stationary projector focussed on said screen carried by at least one of these uprights, an electric circuit, means operatively connected with said motive means for successively connecting one of these projectors with said circuit and simultaneously disconnecting the other one from said circuit, a band of pictures carried by said carriage and adapted to be moved in front of the first mentioned projector, and means for moving said band forwards in accordance with the up and down movements of said carriage.

2. An apparatus according to claim 1 in which the means for constantly focussing the first mentioned projector on the screen include a cam forming member carried by said frame and a system of levers supported by said carriage and adapted to run along said cam forming member said levers being operatively connected with the first mentioned projector for adjusting the focussing thereof.

3. An apparatus according to claim 1 further including a pathway for the band of pictures carried by said movable carriage and in which the means for moving said band forwards include gripping members for catching said band, a cam forming member carried by said frame and a system of levers adapted to run along said cam forming member and supported by said carriage, said levers being operatively connected with said gripping members so as to move the band forwards during the upward movement of the carriage and to keep it stationary in said pathway during the downward movement of the carriage.

4. An apparatus for the projection of advertising and other images on a screen provided at the top of a box, which comprises in combination, a frame, four uprights in said frame, a carriage movable vertically along two of these uprights, a projector carried by said carriage, a plurality of sprocket wheels journalled in said frame, an endless chain passing around said sprocket wheels, at least one finger carried by said chain for engaging a part of said carriage so as to drive it upwardly and control its downward movement under the action of its weight, means operatively controlled by said chain for constantly focussing said projector on said screen, a stationary projector carried by at least one of the two other uprights, and electric circuit, means operatively controlled by said chain for alternately connecting one of said projectors with said circuit and simultaneously disconnecting the other one from said circuit, a band of pictures for the first mentioned projector, a pathway for said band of pictures carried by said movable carriage, and means operatively controlled by said chain for intermittently moving said band of pictures in front of said first mentioned projector in accordance with the movements of said carriage.

5. An apparatus according to claim 4 in which the means for alternately connecting one of said projectors with said circuit and disconnecting at the same time the other one from said circuit include a mercury switch and a finger carried by said chain for pivoting said switch.

6. An apparatus according to claim 4 in which the means for alternately connecting one of said projectors with said circuit and simultaneously disconnecting the other one from said circuit include a pivotable mercury switch for controlling the connections of said circuit with said projectors, a finger carried by said chain adapted to pivot said switch for bringing it into the position in which it connects said circuit wth the second mentioned projector and a rod adapted to be actuated by the carriage at the end of the upward stroke thereof for bringing the switch back into its initial position.

HENRI HEAULME.